No. 890,879. PATENTED JUNE 16, 1908.
B. E. SCRIVEN & W. C. SMITH.
MECHANICAL VARIABLE TRANSMISSION MECHANISM.
APPLICATION FILED NOV. 9, 1906.
5 SHEETS—SHEET 1.
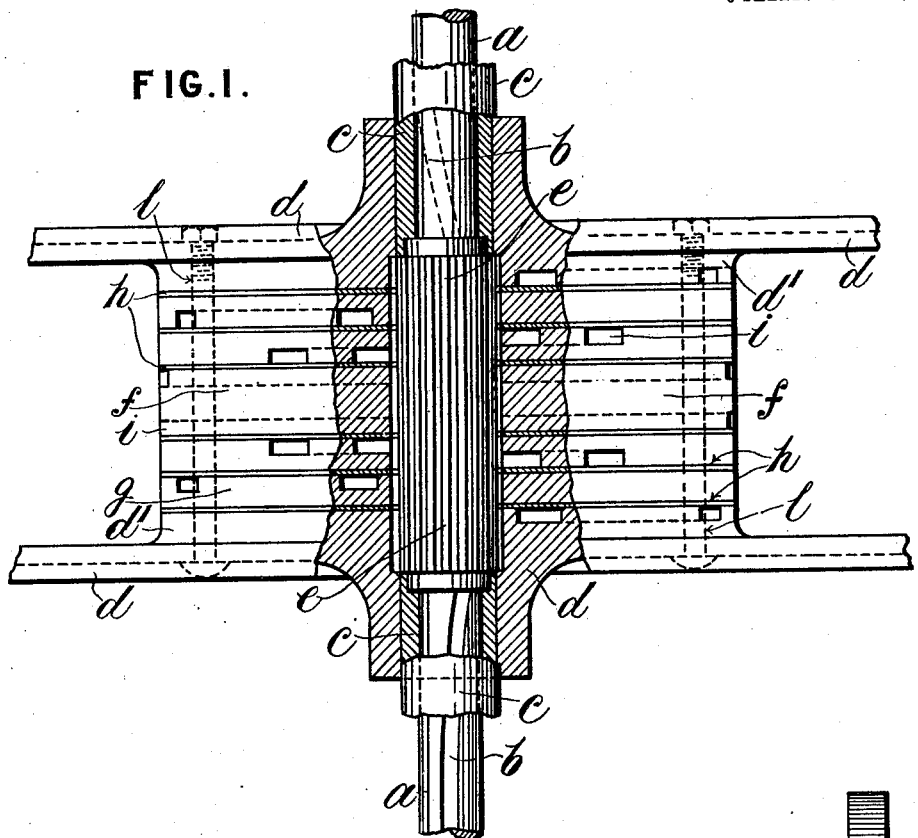
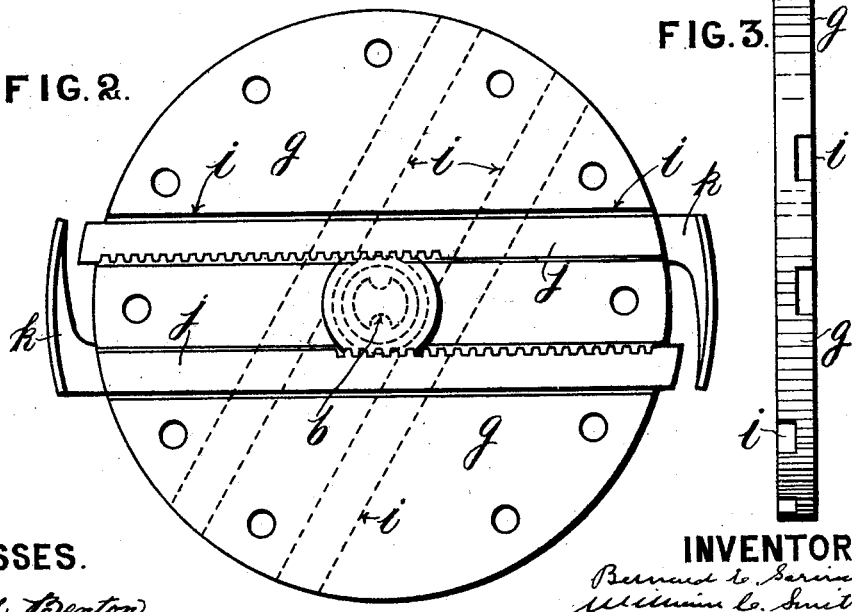
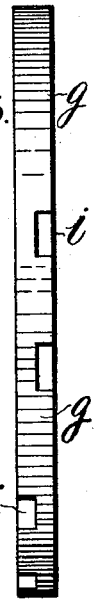
WITNESSES.
Joseph Benton
Charles Orton
INVENTORS.
Bernard E. Scriven
William C. Smith
By William D. Taylor
Atty.

No. 890,879. PATENTED JUNE 16, 1908.
B. E. SCRIVEN & W. C. SMITH.
MECHANICAL VARIABLE TRANSMISSION MECHANISM.
APPLICATION FILED NOV. 9, 1906.

5 SHEETS—SHEET 2.

WITNESSES.
Joseph Benton
Charles Orton

INVENTORS.
Bernard E. Scriven
William C. Smith
By William B. Taylor
Atty.

No. 890,879. PATENTED JUNE 16, 1908.
B. E. SCRIVEN & W. C. SMITH.
MECHANICAL VARIABLE TRANSMISSION MECHANISM.
APPLICATION FILED NOV. 9, 1906.
5 SHEETS—SHEET 3.
FIG. II.
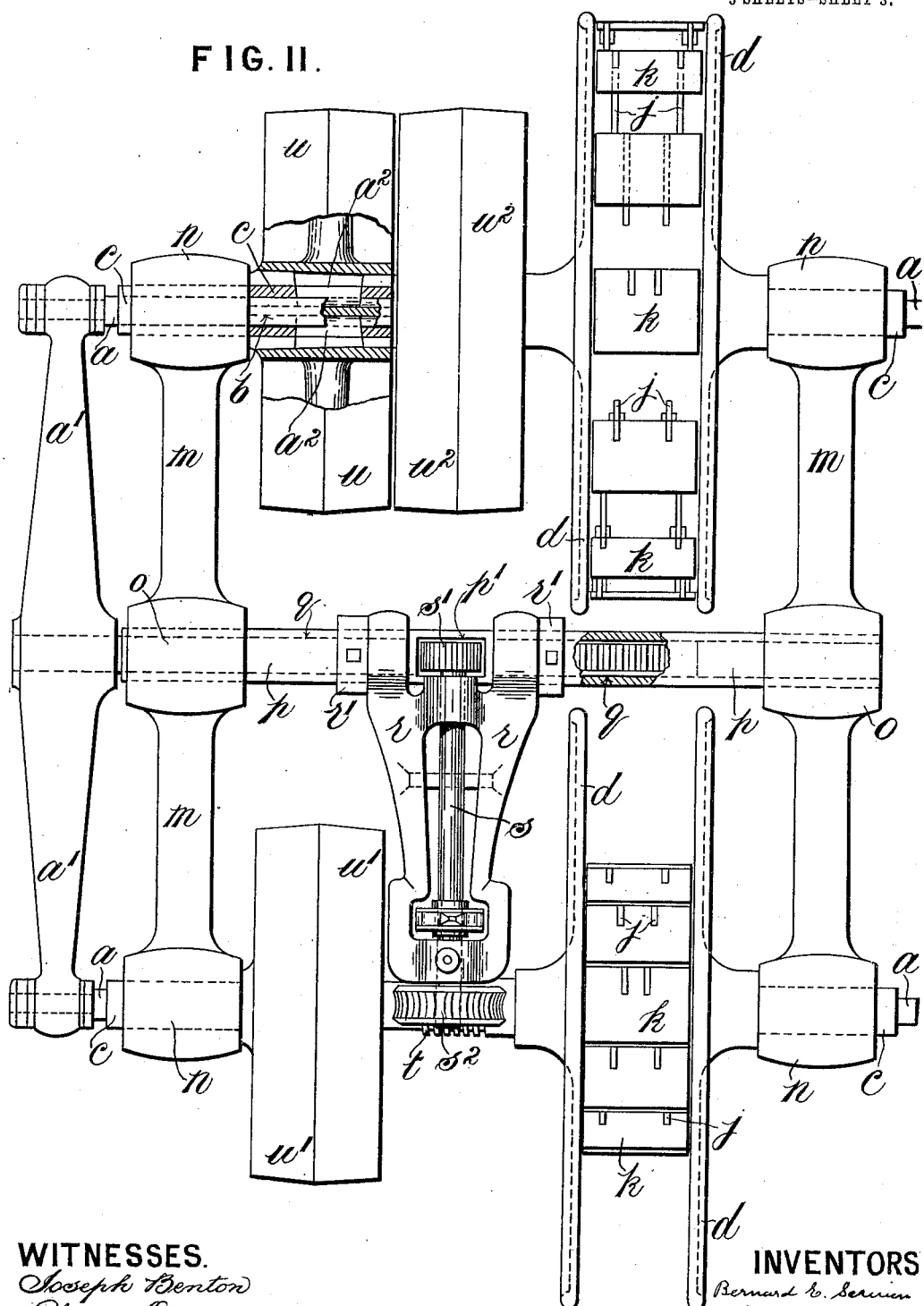
WITNESSES.
Joseph Benton
Charles Orton
INVENTORS
Bernard E. Scriven
William C. Smith
By William B. Taylor
Atty.

No. 890,879. PATENTED JUNE 16, 1908.
B. E. SCRIVEN & W. C. SMITH.
MECHANICAL VARIABLE TRANSMISSION MECHANISM.
APPLICATION FILED NOV. 9, 1906.

5 SHEETS—SHEET 4.

WITNESSES.
Joseph Benton.
Charles Orton.

INVENTORS.
Bernard E. Scriven
William C. Smith
By William D. Taylor
Atty.

No. 890,879. PATENTED JUNE 16, 1908.
B. E. SCRIVEN & W. C. SMITH.
MECHANICAL VARIABLE TRANSMISSION MECHANISM.
APPLICATION FILED NOV. 9, 1906.

5 SHEETS—SHEET 5.

WITNESSES.
Joseph Bexton
Charles Orton

INVENTORS.
Bernard E. Scriven
William C. Smith
By William P. Taylor
Atty.

UNITED STATES PATENT OFFICE.

BERNARD EVERETT SCRIVEN AND WILLIAM CHURCH SMITH, OF STRETFORD, ENGLAND

MECHANICAL VARIABLE-TRANSMISSION MECHANISM.

No. 890,879.  Specification of Letters Patent.  Patented June 16, 1908.

Application filed November 9, 1906. Serial No. 342,716.

*To all whom it may concern:*

Be it known that we, BERNARD EVERETT SCRIVEN and WILLIAM CHURCH SMITH, both subjects of the King of Great Britain and Ireland, and residents of Stretford, in the county of Lancaster, England, engineers, have invented certain new and useful Improvements in Mechanical Variable-Transmission Mechanism, of which the following is a specification.

This invention relates to improvements in mechanical variable transmission mechanism, the object being to provide an improved form of apparatus more especially applicable to a parallel-faced pulley or one in which the transmission face is more or less parallel with the axis of the driving or driven shafts and which is of a very simple character.

Figure 4:
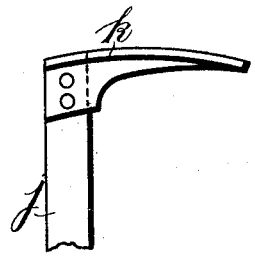
Figure 6:
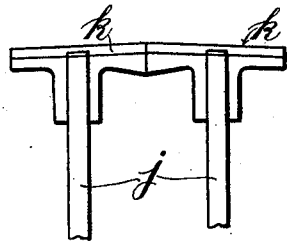
Figure 5:
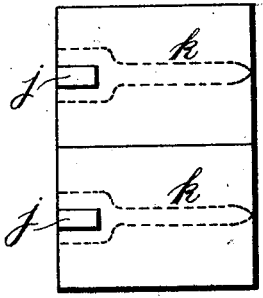
Figure 9:
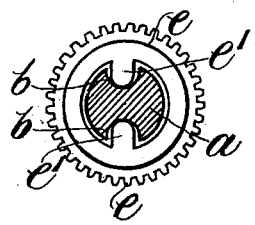
Figure 10:
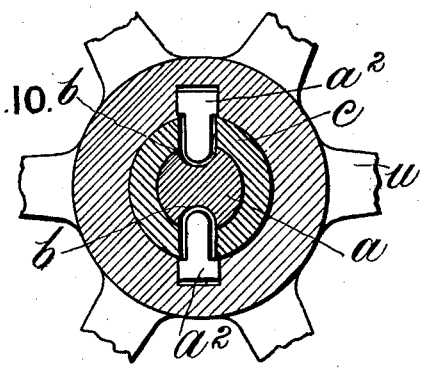
Figure 12:
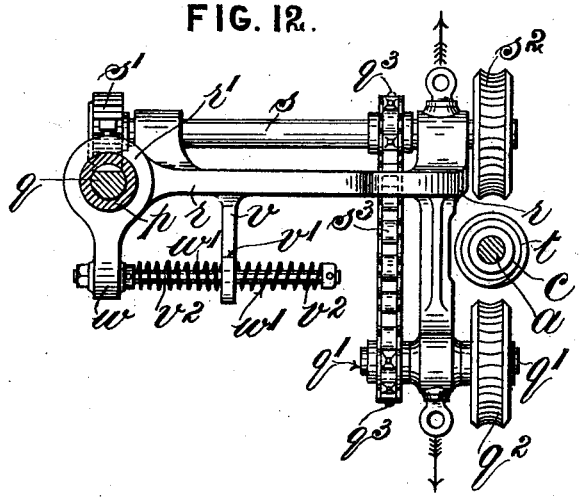
Figure 13:
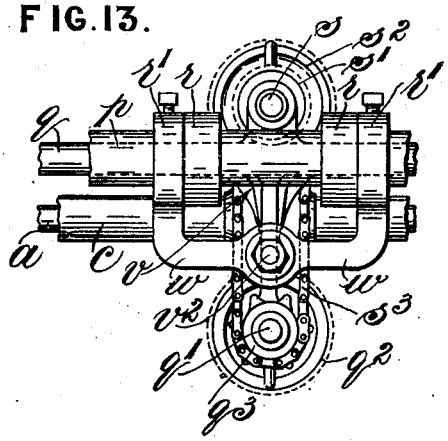
Figure 14:
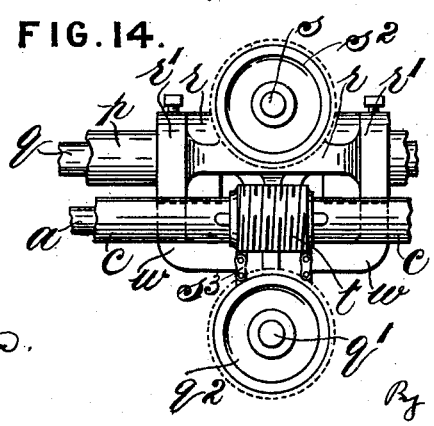

Our invention will be fully described with reference to the accompanying drawings in which Figure 1 is an elevation, partly in section, of one of the pulleys forming part of the variable transmission mechanism, Fig. 2 a side elevation of one of the plates forming part thereof, Fig. 3 elevation of the disk or plate, Fig. 4 partial side elevation of one of the driving arms or belt surfaces, Fig. 5 plan of same, Fig. 6 rear elevation, Fig. 7 elevation of part of one of the shafts, Fig. 8 transverse section of same, Fig. 9 transverse section through one of the central shafts and pinion to an enlarged scale, Fig. 10 transverse section through one of the pairs of shafts and one of the fast pulley bosses to an enlarged scale, Fig. 11 plan showing a general arrangement of the transmission mechanism, Fig. 12 side elevation of a portion of the transmission mechanism, Figs. 13 and 14 elevations from opposite ends of a portion of the transmission mechanism, Fig. 15 plan of a modified form of expansion pulley on a reduced scale, Fig. 16 sectional plan of same.

In carrying out our invention and describing it with reference to the aforesaid drawings it should be understood that each expansion pulley is identical in construction though in use both may be of different diameters, or may be of equal diameters when expanded midway.

Figure 7:
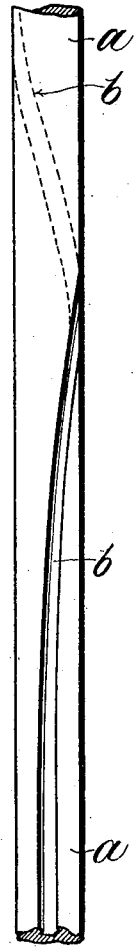
Figure 8:

In the drawings $a$ indicates a central shaft provided with one or more grooves $b$ (preferably two), such grooves being straight along some portion of the shaft while the remainder is of screw formation as will be clearly seen from Fig. 7, though the grooving here shown is only intended to indicate the general idea of the grooves and not necessarily their exact form. The central shaft is surrounded by two tubular shafts $c$, one on either side of the expansion pulley, and on each of these is fixed, by any suitable means, an end disk $d$ forming part of the pulley and preferably having a flange of a diameter practically corresponding with the largest diameter the pulley can be expanded to, such flanges being adapted to keep the transmission belt in position as will be readily understood, though they are not absolutely necessary.

Mounted on the central shaft $a$ and located between the disks $d$ is a pinion $e$ having an internal feather, or feathers $e^1$ (Fig. 9) cast with or secured to the pinion, such feathers, longitudinally, following the screw form of the grooves $b$ in the shaft $a$ and with which they engage. The central portion of each pulley is composed of a central disk $f$, disks $g$ and thin metal plates $h$, the latter being adapted to fit in between the other disks just referred to. Each of the disks $d$ is formed with an internal boss $d^1$ corresponding in diameter to the disks $f$ and $g$. Each of the disks $f$ and $g$ and bosses $d^1$ are provided with slots $i$ passing across their faces, as will be more clearly seen from Figs. 2 and 3, these slots being adapted to receive rods or arms $j$ which, as will be seen from Fig. 2, are each provided on one side with teeth for the greater portion of their length, adapted to gear with the pinion $e$. One end of each rod or arm has fitted to it a belt surface or contact $k$ secured to it in any suitable manner such contact having a curved face preferably struck to a curve corresponding with the smallest diameter of the pulley, when the arms are in the position indicated in Fig. 2, thereby forming a comparatively perfect pulley face, since the whole of the contacts fit against each other. When they are expanded, however, spaces are left between the belt contacts as will be seen from the left hand pulley in Fig. 11, though the transmission surface is quite sufficient for driving purposes. By rotating the central shaft $a$ and with it the pinion $e$ the arms or rods $j$ can be forced outward or drawn inward to whatever diameter is required, the slots $i$ enabling the rods to slide freely although the disks $f$ and $g$, plates $h$ and end disks $d$ are secured together by bolts $l$, the plates $h$ enabling a straight or fitting face to be obtained for the rods to slide against on one side while the base of the grooves or slots $i$ in each disk forms the straight surface on the outer side.

The mechanism for expanding and contracting the pulleys will be best understood from the general arrangement indicated in Figs. 11 to 14 in which $m$ represents two supporting brackets or hangers formed with bearings $n$ at either end for the tubular shafts $c$, said bearings being of any suitable character. The brackets are also provided with bosses $o$ in the center of which is fixed a tubular shaft or rod $p$ which acts as a stay between the two brackets. To one end of each of the grooved shafts $a$ is secured a cross head $a^1$ having a central boss to which is secured a rack $q$ passing through the shaft or rod $p$, the latter having a slot $p^1$ at one side near the center of its length. Loosely mounted on the shaft $p$ is a bracket $r$, kept in position longitudinally by collars $r^1$, the opposite end of the bracket being located near to one of the shafts $c$ of the transmission gear. The bracket is adapted to support a shaft $s$ one end of which carries a pinion $s^1$ in gear with the rack $q$ while the other end carries a worm wheel $s^2$ capable of engaging with a worm $t$ formed in, or fixed upon, one of the tubular shafts $c$. The worm wheel is, however, normally kept out of contact with the worm by a weight attached to a cord or chain or by means of a spring; but when it is desired to expand one and contract the other expansion pulley the worm wheel is pulled into engagement with the worm and the tubular shaft being continually rotating the shaft $s$ is actuated and through the pinion $s^1$ the rack $q$ is forced outward. This movement is transmitted by the cross head $a^1$ to the shafts $a$ which through the feathers $e^1$ cause the pinion $e$ in each expansion pulley to operate the arms or rods $j$ and so expand or contract the latter. The apparatus described acts in one direction only but the bracket $r$ may carry a similar stud $q^1$ to $s$ at the opposite side of the shaft $c$ also having a worm wheel $q^2$ adapted to engage with the opposite side of the worm $t$ so that motion can be transmitted from this second shaft through the agency of a pair of sprocket wheels $q^3$ on shafts $s$ and $q^1$ and a chain $s^3$ whereby the rack $q$ can be moved in the opposite direction. The bracket $r$ is kept in the central or normal position by having formed in one with or securing to it an arm $v$ slotted at $v^1$ to embrace a rod or stud $v^2$ carried by a bridge piece $w$ fixed to the shaft $c$ or collars $r^1$, the rod supporting springs $w^1$ on either side of the arm. When the bracket is lowered or raised by the operating cord or chain the corresponding worm wheel is brought into gear, but normally the wheels are out of gear.

$u$ is a pulley fixed upon the tubular shaft $c$ by means of combined keys and feathers $a^2$ (see Figs. 10 and 11) the inner portion of the latter engaging with the straight portions of the grooves $b$ in the shaft $a$ thereby enabling the whole of the parts to revolve together but allowing shaft $a$ freedom to slide endwise within the shaft $c$ for expansion and contraction purposes as already described. $u^1$ is a second fast pulley connected to $u$ by a belt. $u^2$ is a loose pulley. Pulleys $u$ and $u^2$ may both be loose and be arranged on the shaft a little distance from each other. By these means and by the employment of crossed and open belts and the arrangement of a one-worm-gear as already described the pulleys may be expanded and contracted at will. The expansion and contraction of the pulleys can therefore be carried out easily and quickly by the rotation of the tubular shafts themselves. Hand gear may, however, be employed by merely allowing the bracket $r$ to be suspended from its shaft and substituting for the worm wheel, a hand wheel. In such a case the bracket could be fixed to the shaft or rod.

Figure 15:
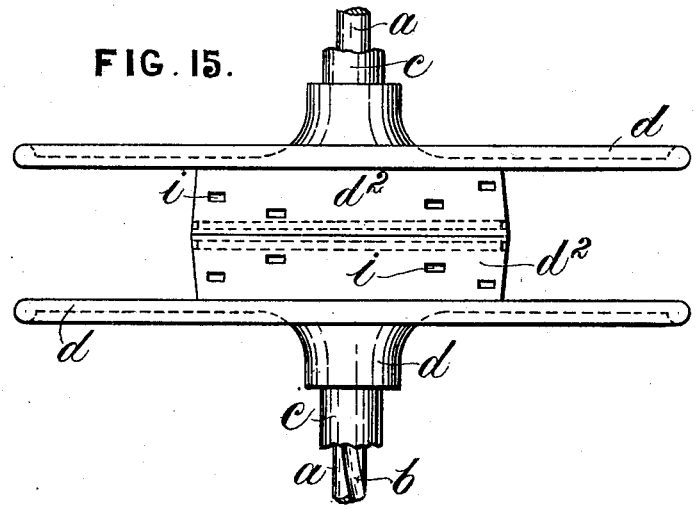
Figure 16:
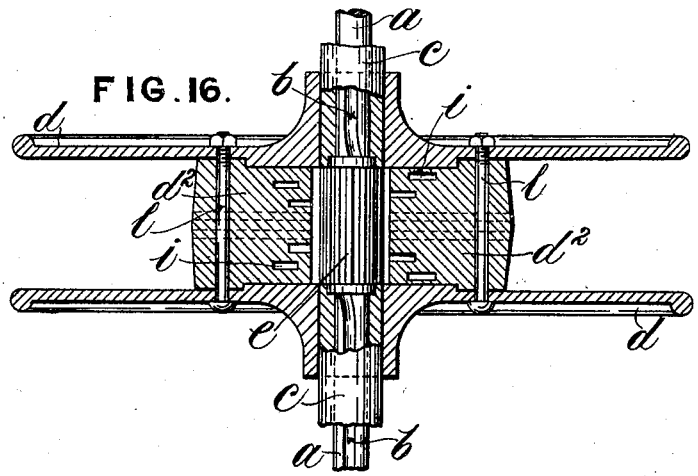

Instead of the construction of expansion pulley described we may adapt one in which the number of parts are considerably reduced, the arrangement being indicated in Figs. 15 and 16. In this case there are two end disks $d$ as before and one central disk $d^2$, this latter having the slots $i$ formed in it by making the boss of cast iron or other suitable metal and employing chill rods or cores during molding. Provision is made in the interior of the disk $d^2$ for the pinion $e$. The end disk $d$ and disk $d^2$ are secured together by bolts $l$ as before. In other respects the arrangement of the other parts is the same as already described.

What we claim as our invention and desire to protect by Letters Patent is:—

1. In a mechanical variable transmission mechanism, an expanding and contracting pulley comprising a central grooved shaft capable of moving endwise, a pinion mounted on and engaging said shaft, tubular shafts surrounding the central shaft, disks on said tubular shafts, slotted disks secured to the first named disks, a series of toothed rods passing through the slot in the disks and engaging with the pinion on the central shaft, and belt contacts on the outer ends of the rods.

2. In a mechanical variable transmission mechanism, an expanding and contracting pulley comprising a central grooved shaft capable of moving endwise, a pinion mounted on and engaging the said shaft, tubular shafts surrounding the central shaft, disks on said tubular shafts, a central slotted boss secured to the disks, a series of toothed rods passing through the slots in the boss, slotted disks secured to the first named disks, a series of toothed rods passing through the slots of the second named disks and engaging the pinion of the central shafts, and belt contacts on the outer ends of the rods.

3. In a mechanical variable transmission mechanism, an expanding and contracting pulley consisting of a grooved shaft, a pinion mounted on said shaft and engaging the grooves thereof, a slotted pulley mounted on the shaft embracing the pinion, rods extending within the openings of the pulley having teeth engaging the pinion of the shaft, and belt contacts on the rods.

4. A mechanical variable transmission mechanism comprising a pair of grooved central shafts, tubular shafts, surrounding each of said central shafts, a worm on one of said tubular shafts, expansion pulleys carried by said tubular shafts, belt pulleys mounted on the tubular shafts, bearings for supporting the shafts, a tubular stay rod, a cross head coupling the central shafts together, a rack carried by the said rod and coupled to the cross head, a bracket pivoted to the said rod, a shaft carried by said bracket, a pinion on the shaft for engaging the rack, said shaft being provided with a worm wheel to engage with a worm on one of the tubular shafts, and means for causing the worm wheel to engage with the worm.

5. A mechanical variable transmission mechanism comprising a pair of grooved central shafts, tubular shafts surrounding each of said central shafts, expansion pulleys carried by said tubular shafts, belt pulleys mounted on the tubular shafts, bearings for supporting the shafts, a tubular stay rod, a cross head coupling the central shafts together, a worm on one of said tubular shafts, a rack carried by the stay rod and coupled to the cross head, a bracket pivoted to the stay rod, a shaft carried by said bracket, a pinion on said shaft for engaging with the rack, a worm wheel on said shaft to engage with the worm on one of the tubular shafts, a second shaft carried by the bracket, a worm wheel on the second shaft to engage with the worm on the tubular shaft, a sprocket wheel and chain mechanism for connecting the two shafts together, means for causing the worm wheels to engage with the worm, and a spring and rod device connected with the bracket for holding the latter in its normal position.

In testimony whereof we have hereunto set our hands in the presence of two witnesses.

BERNARD EVERETT SCRIVEN.
WILLIAM CHURCH SMITH.

Witnesses:
MABEL LEE,
WILLIAM H. TAYLOR.